(12) United States Patent
Kawai

(10) Patent No.: US 7,043,595 B2
(45) Date of Patent: May 9, 2006

(54) DATA TRANSFER CONTROL DEVICE

(75) Inventor: Hideki Kawai, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 282 days.

(21) Appl. No.: 10/790,675

(22) Filed: Mar. 3, 2004

(65) Prior Publication Data
US 2004/0199709 A1 Oct. 7, 2004

(30) Foreign Application Priority Data
Mar. 4, 2003 (JP) .............................. 2003-056463

(51) Int. Cl.
*G06F 13/36* (2006.01)
(52) U.S. Cl. ...................................... 710/314; 710/118
(58) Field of Classification Search ................ 710/118, 710/125, 314
See application file for complete search history.

(56) References Cited

U.S. PATENT DOCUMENTS

| | | | | |
|---|---|---|---|---|
| 4,922,244 A | * | 5/1990 | Hullett et al. ............ | 340/825.5 |
| 5,905,878 A | * | 5/1999 | LaBerge ..................... | 710/114 |
| 6,044,207 A | * | 3/2000 | Pecone et al. .............. | 710/314 |
| 6,078,976 A | | 6/2000 | Obayashi .................... | 710/128 |
| 6,910,088 B1 | * | 6/2005 | LaBerge ..................... | 710/117 |

OTHER PUBLICATIONS

PCI Local Bus Specification Revision 2.2 Dec. 18, 1998.*
EP440 PCI-to-PCI Bridge copyright 2000.*

* cited by examiner

*Primary Examiner*—Paul R. Myers
(74) *Attorney, Agent, or Firm*—Steptoe & Johnson LLP

(57) ABSTRACT

Even when an S-PCI bus 1b requests transfer while a P-PCI bus 1a is executing burst transfer, assert of a TRDY# signal for data transfer of the P-PCI side is delayed so that next data transfer of the P-PCI side is completed within 8 clock cycles since the TRDY# signal for data transfer of the P-PCI side is asserted.

5 Claims, 10 Drawing Sheets

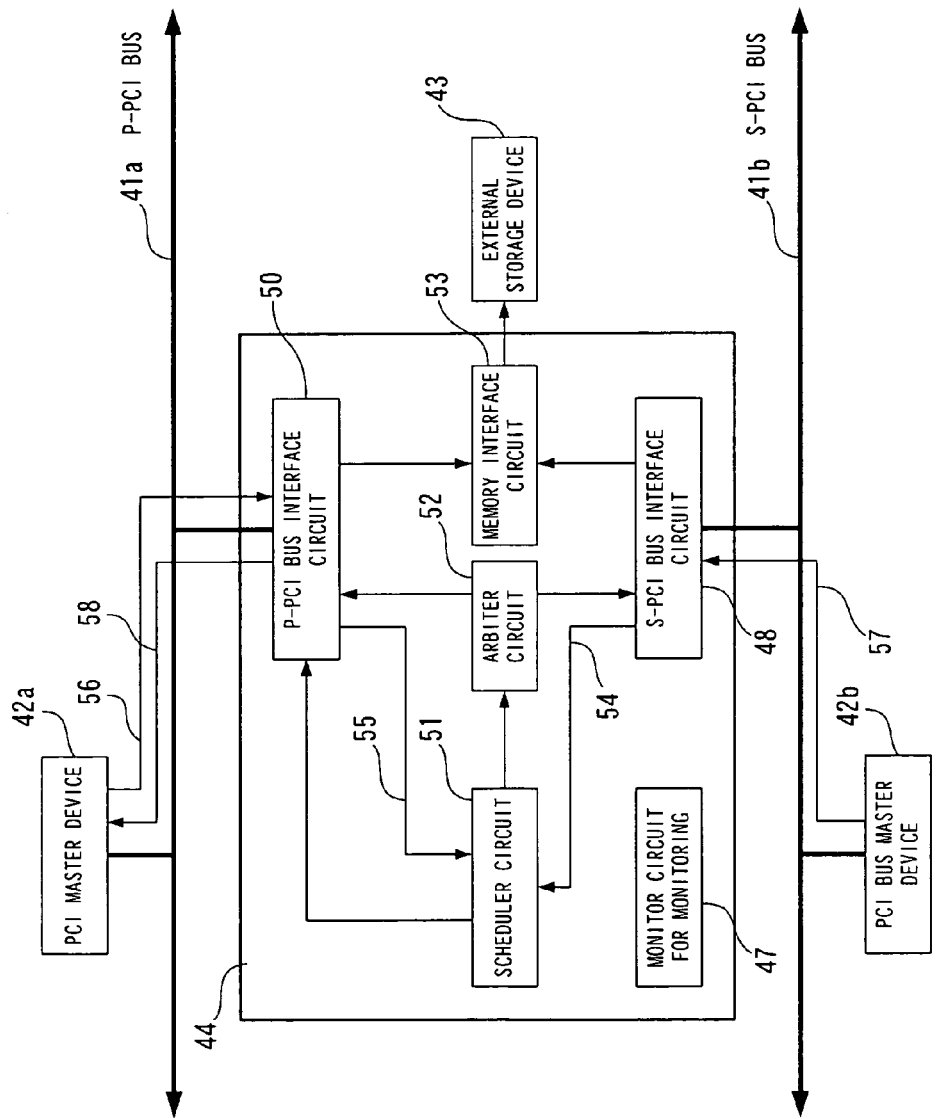
F I G. 5

DATA TRANSFER CONTROL DEVICE

BACKGROUND OF THE INVENTION

1. Field of the Invention

The present invention relates to a data transfer control device for controlling the data transfer between a plurality of PCI buses in a system comprising a plurality of PCI buses.

2. Description of the Related Art

A PCI (Peripheral Component Interconnect) bus is described in detail in the PCI Local Bus Specification, Rev. 2.1, for example. The PCI bus has a characteristic in that the address transfer and the data transfer are performed in 32 signal lines in time division multiplex. If transfer by multiplex is performed, data stored in the continuous address in the storage device of a peripheral device can be transferred to another peripheral device at high-speed. In data transfer via the PCI bus, it is essential to acquire an access right to the PCI bus, and a master device, which is always installed for the PCI bus, grants the access right to one of the plurality of devices connected to the PCI bus.

In this case, when a device connected to one PCI bus out of two PCI buses performs burst transfer to an external storage device connected to the data transfer control device, it is necessary to complete the next data transfer within 8 clock cycles after one data transfer is completed, so that the burst transfer is not interrupted.

However, as the timing chart depicting the operation of the data transfer control device in the prior art in FIG. 2 shows, memory access takes 5 clock cycles, so if access for a clock cycles to a target device is generated at the secondary PCI bus (hereafter S-PCI bus) side when the burst transfer, of which the data transfer interval is 5 clock cycles, is being executed at the primary PCI bus (hereafter P-PCI bus) side, it takes 10+α clock cycles, that is, S-PCI side transfer clock cycle α+P-PCI side memory access 5 clock cycles+P-PCI side transfer 5 clock cycles, from the completion of the previous data transfer to the completion of the data transfer of the P-PCI bus after memory access from the S-PCI bus. Therefore burst transfer may be interrupted since the 8 clock rule cannot be maintained, and access to both memories while following the 8 clock rule specified by the PCI bus cannot be arbitrated, so data cannot be transferred at high-speed.

It is an object of the present invention to implement high-speed data transfer even if access is generated at the S-PCI bus side during burst transfer at the P-PCI bus side.

SUMMARY OF THE INVENTION

In order to achieve the above object, the data transfer control device according to the first invention is a data transfer control device connected with a primary PCI bus, secondary PCI bus and external storage device, for controlling access of the primary PCI bus and the secondary PCI bus with the external storage device, comprising: a P-PCI bus side counter circuit for counting the transfer period of the primary PCI bus by clock cycle count; an S-PCI bus side counter circuit for counting the transfer period of the secondary PCI bus by clock cycle count; a scheduler circuit for controlling assert timing of TRDY# of the primary PCI bus and access of the primary PCI bus and the secondary PCI bus by the counter value of the P-PCI bus side counter circuit and counter value of the S-PCI bus side counter circuit; an arbiter circuit for arbitrating access of the primary PCI bus and the secondary PCI bus according to the control of the scheduler circuit; an S-PCI bus interface to be an interface for accessing of the secondary PCI bus to the external storage device according to the arbitration of the arbiter circuit; a P-PCI bus interface circuit for interfacing access between the primary PCI bus and the external storage device according to the arbitration of the arbiter circuit and arbitrating the assert timing of TRDY# according to the control of the scheduler; and a memory interface circuit for arbitrating access of the primary PCI bus or the secondary PCI bus to the external storage device, wherein when access of the secondary PCI bus to the external storage device is generated while the primary PCI bus is executing burst transfer to the external storage device, assert of a TRDY# signal of the burst transfer of the primary PCI bus to the external storage device just before access of the secondary PCI bus to the external storage device is delayed such that the period until assert of a TRDY# signal of next burst transfer of the primary PCI bus to the external storage device would satisfy a standard value for burst transfer continuation.

The data transfer control device according to the second invention is a data transfer control device connected with a primary PCI bus, secondary PCI bus and external storage device, for controlling access of the primary PCI bus and the secondary PCI bus with the external storage device, comprising: a P-PCI bus side counter circuit for counting the transfer period of the primary PCI bus by clock cycle count; an S-PCI bus side counter circuit for counting the transfer period of the secondary PCI bus by clock cycle count; a scheduler circuit for controlling assert timing of TRDY# of the primary PCI bus and access of the primary PCI bus and the secondary PCI bus by the counter value of the P-PCI bus side counter circuit and the counter value of the S-PCI bus side counter circuit; an arbiter circuit for arbitrating access of the primary PCI bus and the secondary PCI bus according to the control of the scheduler circuit; an S-PCI bus interface circuit to be an interface for accessing of the secondary PCI bus to the external storage device according to the arbitration of the arbiter circuit; a P-PCI bus interface circuit for interfacing access of the primary PCI bus to the external storage device according to the arbitration of the arbiter circuit and arbitrating the assert timing of TRDY# according to the controller of the scheduler; and a memory interface circuit for arbitrating access of the primary PCI bus or the secondary PCI bus to the external storage device, wherein when a plurality of accesses of the secondary PCI bus to the external storage device is generated while the primary PCI bus is executed burst transfer to the external storage device, access of the primary PCI bus to the external storage device and access of the secondary PCI bus to the external storage device are repeated, and assert of a TRDY# signal of the burst transfer of the primary PCI bus to the external storage device just before each access of the secondary PCI bus to said external storage device is delayed such that the period until assert of a TRDY# signal of the next burst transfer of the primary PCI bus to the external storage device would satisfy a standard value for burst transfer continuation.

The data transfer control device according to the third invention is a data transfer control device connected with a primary PCI bus, secondary PCI bus and external storage device, for controlling access of the primary PCI bus and the secondary PCI bus with the external storage device, comprising: a scheduler circuit for controlling access of the primary PCI bus and the secondary PCI bus, disconnecting the primary PCI bus and requesting access of the secondary PCI bus to the external storage device when access of the secondary PCI bus to the external storage device is generated while the primary PCI bus is executing burst transfer to the external storage device, and then successively requesting access of the primary PCI bus to the external storage device; an arbiter circuit for arbitrating access of said primary PCI bus and the secondary PCI bus according to the control of the scheduler circuit; an S-PCI bus interface circuit to be an interface for accessing of the secondary PCI bus to the external storage device according to the arbitration of the arbiter circuit; a P-PCI bus interface circuit for interfacing access of the primary PCI bus to the external storage device according to the arbitration of the arbiter circuit; and a memory interface circuit for arbitrating access of the primary PCI bus or the secondary PCI bus to the external storage device, wherein when access of the secondary PCI bus to the external storage device is generated while the primary PCI bus is executing burst transfer to the external storage device, transfer of the primary PCI bus to the external storage device is prepared while the secondary PCI bus is accessing the external storage device.

The data transfer control device according to the fourth invention is the data transfer control device according to one of the first invention, second invention and third invention, wherein the external storage device has a 32-bit data bus width, and both the burst transfer of the primary PCI bus to the external storage device and access of the secondary PCI bus to the external storage device are executed in 32-bit units.

The data transfer control device according to the fifth invention is the data transfer control device according to one of the first invention, second invention and third invention, wherein the external storage device has a 16-bit data bus width, and a 32-bit burst transfer of the primary PCI bus to the external storage device is executed dividing into significant and least significant 16-bits each, and access of the secondary PCI bus to the external storage device is also executed in 16-bit units.

BRIEF DESCRIPTION OF THE DRAWINGS

FIG. 5 is a timing chart depicting the configuration of a data transfer control device according to embodiment 2 of the present invention;

DESCRIPTION OF THE PREFERRED EMBODIMENTS

Figure 1:
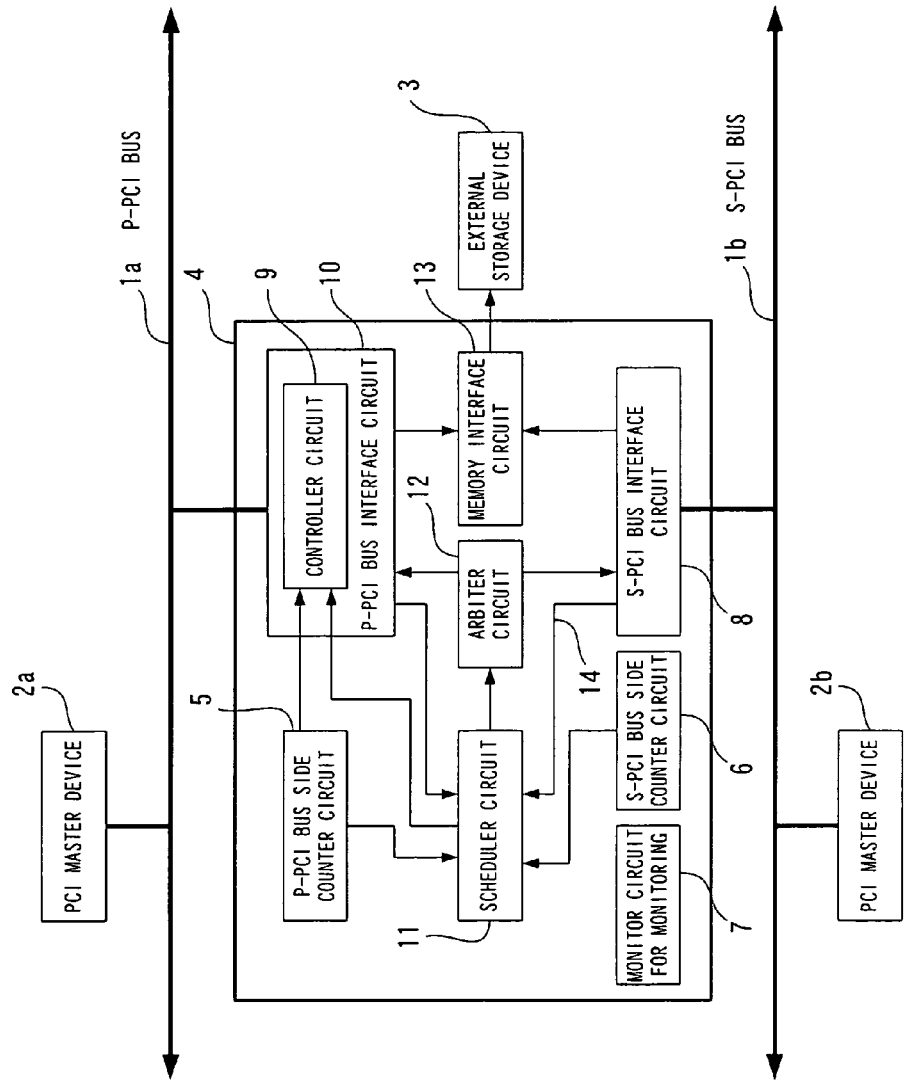
FIG. 1 is a diagram depicting the configuration of a data transfer control device of the present invention.
Figure 2:
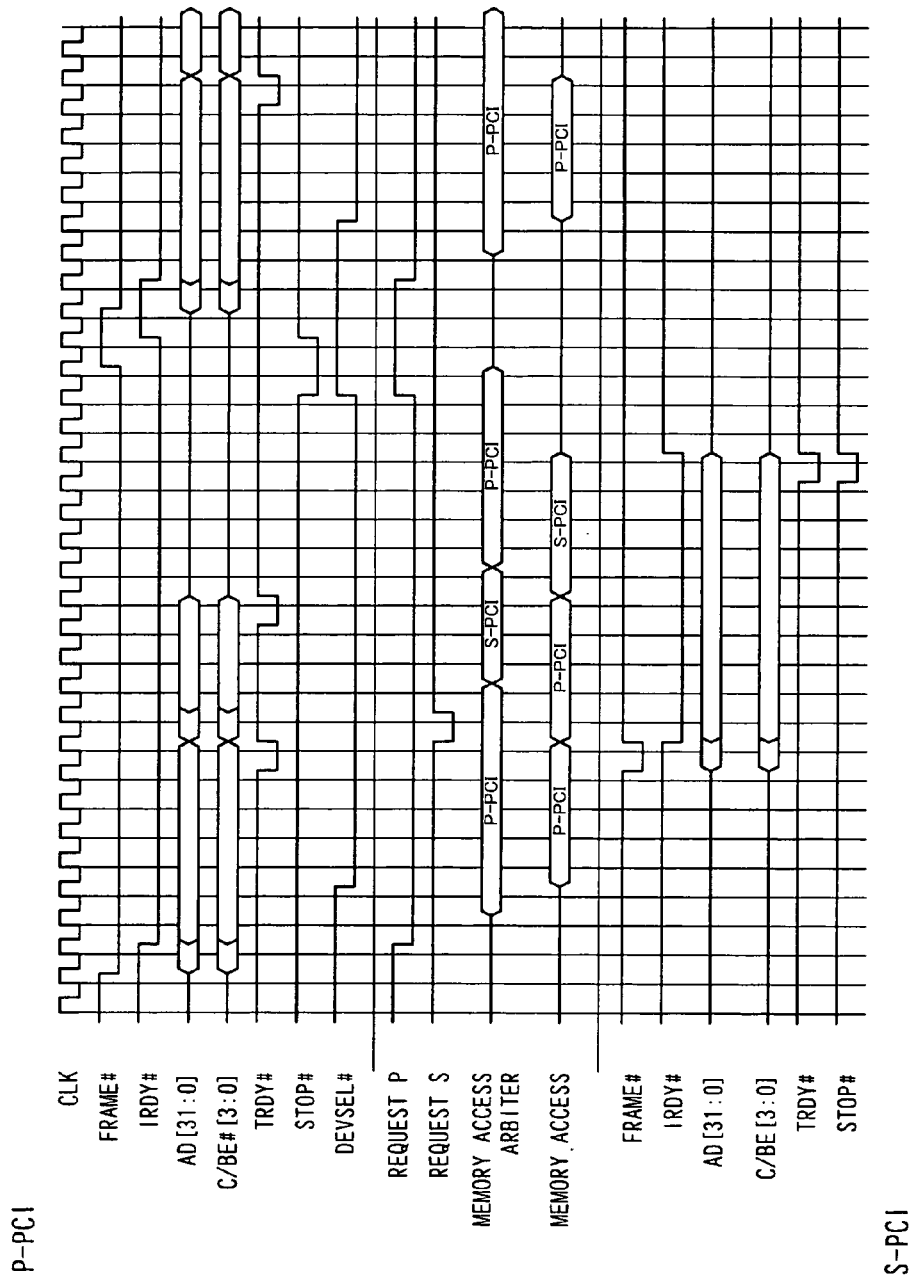
FIG. 2 is a timing chart depicting an operation of a data transfer control device according to a prior art.

Before describing the embodiments of the present invention, the access right of the PCI bus will be described first.

Acquisition of Access Right

The access right of the PCI bus is given to each device by sending the request signal for requesting acquisition of the access right (hereafter REQ) to the master device, and receiving the grant signal which is output from the bus master (hereafter GNT). After the device acquires the access right in this way, the PCI bus of the device enters idle status, sends the address, then asserts the master data transfer preparation completion signal (hereafter IRDY# signal), or asserts the target data transfer preparation signal (hereafter TRDY# signal), and then transfers the data.

Burst Data Transfer

Address and data are multiplexed on the PCI bus, so one or more data are transferred after the address. Such a transfer is called a burst transfer, and the number of data to be transferred at one operation is called a burst transfer length.

Loss of Access Right

The access right which one device acquired will be lost when the STOP# signal is output from the target device to be the transfer destination. The STOP# signal, which indicates the stop of transfer, is output when the target device is not ready for the data transfer or when data transfer cannot continue.

Reacquisition of Access Right

When the access right of the PCI bus is lost in a status where data to be transferred still remains, the request origination device stops the data transfer, opens the PCI bus, and executes the transfer operation again from the step of acquiring the bus access right by the REQ output. The stop of the data transfer operation by the output of the STOP# signal is called a "retry end", and the re-execution of the series of transfer operations due to a retry end is called a "retry operation".

This access right acquisition is the rule of the data transfer when the PCI bus is used. What must be noted in this case is that in order to not interrupt a data transfer, including a burst transfer in a target device to which data is provided from the master device, there are clock rules that must be adhered to. The clock rules of the PCI bus will be described below.

8 Clock Rule

When data cannot be access within 8 clock cycles at a 33 MHz operation frequency (hereafter CLK) since the IRDY# signal and the TRDY# signal are simultaneously asserted during the burst transfer (the STOP# signal is in the asserted state), the target device must execute a disconnect termination. In all the bus cycles, [this rule] must be adhered to by the target or the bridge as a target.

16 Clock Rule

When the target device cannot complete the single access cycle or the initial access of the burst access cycle within a 16 CLK signal line period from the assert of the data transfer request signal (hereafter FRAME# signal), the target device must execute the retry termination (regarding that FRAME was asserted at the first rise edge of CLK, the STOP# signal must be asserted at the $17^{th}$ rise edge of CLK). In the case of the write access cycle, the data is received by the target or the retry termination is executed within the restrictions of the rule. In the case of the read access cycle, the target device must send the data or execute the retry termination within the restrictions of the rule. The target device to execute the retry termination enables data access when the access cycle is repeated.

The above is the case when one PCI bus is used, but if electric load and stability are considered, the maximum number of connectable devices is about 5. If the scale of the system is further expanded, data transfer control devices are installed between a plurality of PCI buses, and using data transfer control devices, the device reads or writes data to/from one of the devices of the other PCI bus, or to/from an external storage medium connected to the data transfer control device.

Now how data transfer to the external storage medium connected to the data transfer control device installed between two PCI buses is executed in the system expanded by installing the data transfer device will be described.

Data Read via Data Transfer Control Device

When one device connected to one PCI bus requests a data read from the external storage medium connected to the data transfer control device, the data transfer control device acquires the access right in the PCI bus at this request destination side, and requests a data read, and also cancels the access right in the other PCI bus. Data is read successively from the request destination device (hereafter target side device) until the request source device (hereafter master device) succeeds in acquiring the access right again in the above mentioned one PCI bus, and the data transfer control device stores the data read from the request destination in the internal buffer. When the master side device succeeds in acquiring the access right in the above mentioned one PCI bus, the device transfer control device successively outputs the data stored in the internal buffer to the master side device.

An overview of the present invention will now be described with reference to the accompanying drawings.

FIG. 1 is a diagram depicting the configuration of the data transfer control device according to the present invention.

In FIG. 1, the data transfer control device 4 is connected to the P-PCI bus 1a and S-PCI bus 1b, the PCI bus 1a and the S-PCI bus 1b have the P-PCI master device 2a and the S-PCI master device 2b, and [the data transfer control device 4] comprises an external storage medium 3, which is not directly connected to the P-PCI bus 1a and the S-PCI bus 1b. The data transfer control device 4 further comprises a P-PCI bus side counter circuit 5, S-PCI bus side counter circuit 6, monitor circuit for monitoring 7, S-PCI bus interface circuit 8, controller circuit 9, P-PCI bus interface circuit 10 which incorporates the controller circuit, scheduler circuit 11, arbiter circuit 12 and memory interface circuit 13.

The P-PCI bus side counter circuit 5 and the S-PCI bus side counter circuit 6 count the number of CLK cycles from the FRAME# signals of each PCI bus from when the P-PCI master device 2a and the S-PCI master device 2b are asserted until when the TRDY# signals, for notifying the completion of a data transfer, are asserted, and the counter is initialized when the TRDY# signals are asserted. For the PCI bus side which is in the middle of a burst transfer, the number of CLK cycles is counted from when the TRDY# signal is asserted until when the next TRDY# signal is asserted, and the counter is initialized each time the TRDY# signal is asserted. The counted number of cycles is notified to the scheduler circuit 11 and the controller circuit 9 each time.

The monitor circuit for monitoring 7 constantly monitors access from the S-PCI master device 2b, and notifies the request S signal 14 from the S-PCI bus interface circuit 8 to the scheduler circuit 11 when the assert of the FRAME# signal is detected.

The S-PCI bus interface circuit 8 and the P-PCI bus interface circuit 10 interface between the P-PCI bus 1a and the S-PCI bus 1b, and constantly notify the access status to the scheduler circuit 11. The P-PCI bus interface circuit 10 incorporates the controller circuit 9 for TRDY#, and the controller circuit 9 arbitrates TRDY# assert timings from the counter circuit 5 and the scheduler circuit 11.

The scheduler circuit 11 monitors the count value and the access status during access by the P-PCI bus side counter circuit 5, S-PCI bus side counter circuit 6, P-PCI interface circuit 10 and S-PCI interface circuit 8, and notifies the current status to the arbiter circuit 12.

The arbiter circuit 12 judges the status notified by the scheduler circuit 11, and arbitrates the access right to the memory interface circuit 13 for the P-PCI bus interface circuit 10 and the S-PCI bus interface 8.

The memory interface circuit 13 assigns the access right of the external storage medium 3 to the P-PCI interface circuit 10 or S-PCI bus interface circuit 8, which acquired the access right by the arbiter circuit 12.

EMBODIMENT 1

Embodiment 1 will be described with reference to FIG. 3 and FIG. 4.

Figure 3:
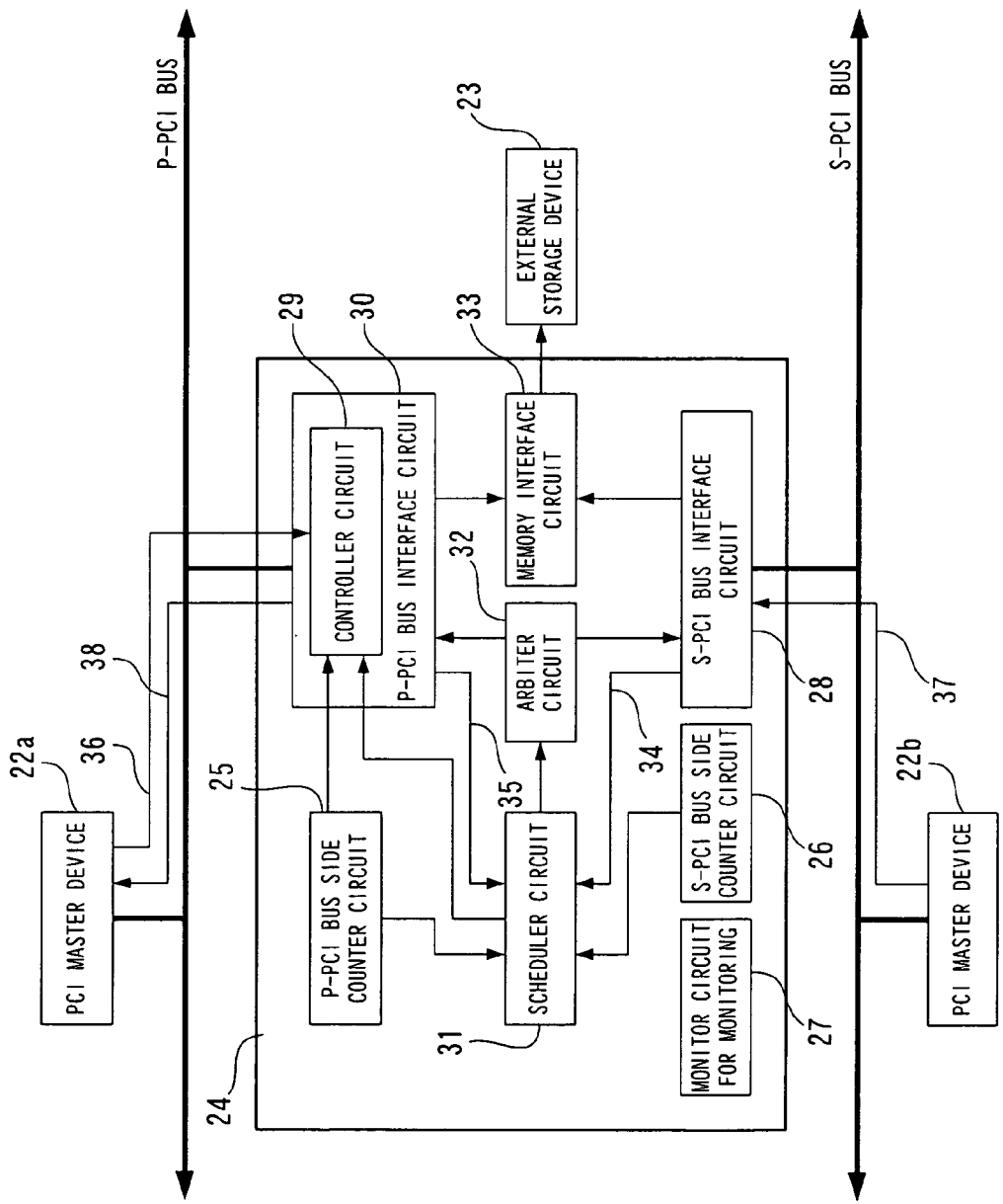
FIG. 3 is a diagram depicting the configuration of the data transfer control device according to embodiment 1 of the present invention.

FIG. 3 is a diagram depicting the configuration of the data transfer control device according to embodiment 1. FIG. 4 is a timing chart depicting the operation of the data transfer control device according to embodiment 1, where the timing chart of each control signal at the P-PCI bus 21a side and the S-PCI bus 21b side, which access the external storage medium 23 with a 32-bit data bus width, are shown at the top and the bottom, and the timing chart of the request S signal line 34 and the request P signal line 35 and the memory access arbiter and the status transition of the memory access are shown in the middle, and in this timing chart, the assert timing of the control signal TRDY# signal at the P-PCI bus side, shown at the top, is delayed.

Figure 4:
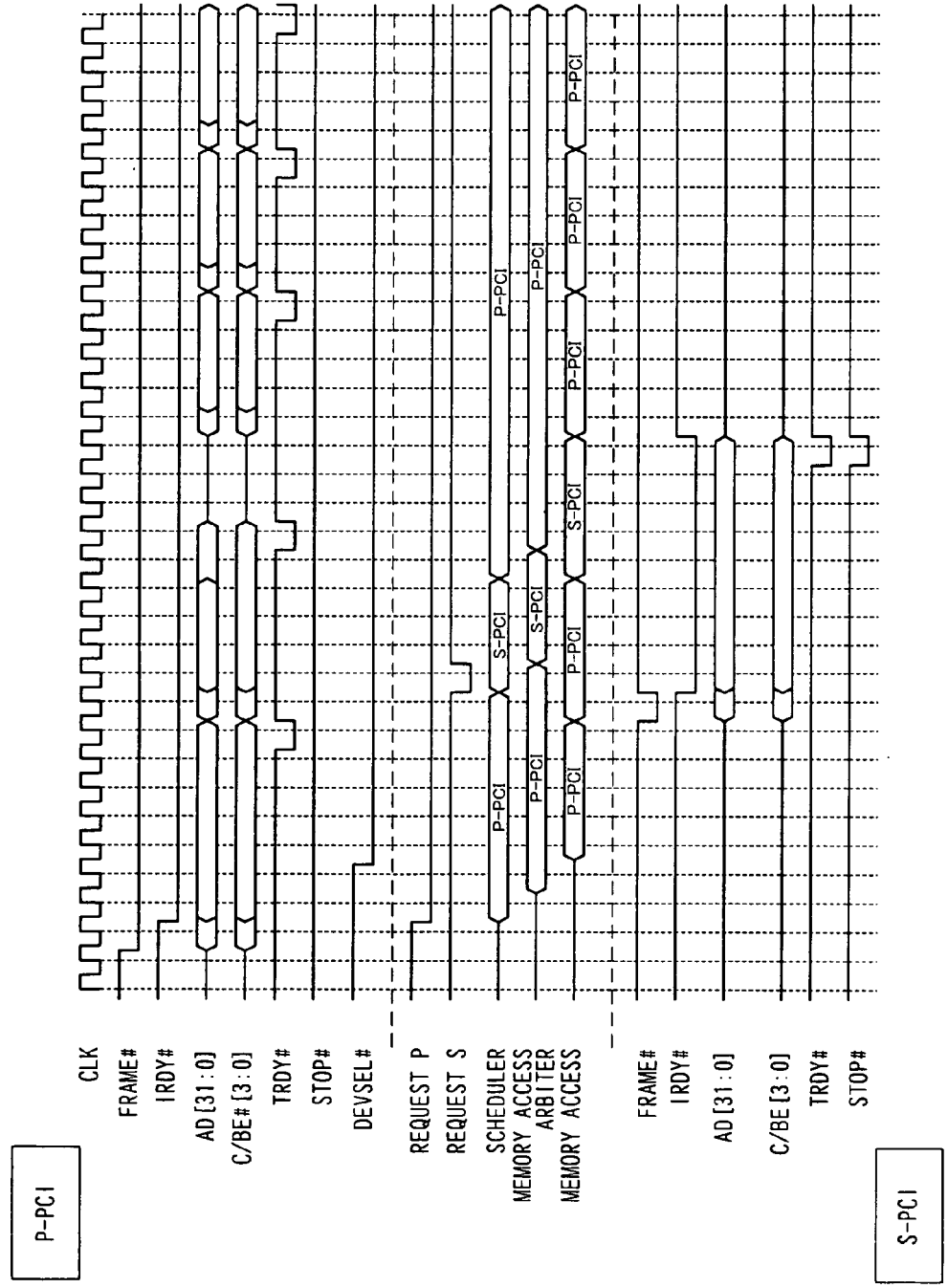
FIG. 4 is a timing chart depicting the operation of the data transfer control device according to the embodiment 1.

In FIG. 3 and FIG. 4, when the P-PCI master device 22a asserts the FRAME# signal 36 to the data transfer control device 24 and requests data transfer, the P-PCI bus interface circuit 30 responds DEVSEL# to the P-PCI master device 22a, and starts accessing the external storage medium 23. After the first data is transferred, the P-PCI bus interface circuit 30 judges the status of the FRAME# signal 36, and confirm that it is in assert status, and then starts burst transfer to the external storage medium 23. While the P-PCI bus side is executing the second data transfer by burst transfer, if the S-PCI master device 22b asserts the FRAME# signal 37 to the data transfer control device 24 and requests a data transfer, the monitor circuit for monitoring 27 detects the access from the S-PCI master device 22b by asserting the FRAME# signal 37, and the S-PCI interface circuit 28 sends the request signal S signal 34 to the scheduler circuit 31 to request data transfer to the S-PCI bus side. In this case, it has been notified from the P-PCI bus side counter circuit 25 that the CLK cycle count, after the TRDY# is asserted, is 2, and it has been notified that from the S-PCI bus counter circuit 26 that the CLK cycle count, after the FRAME# signal is asserted, is 1, so the scheduler circuit 31, which received the request signal 34, notifies the arbiter circuit 32 to delay the assert of the TRDY# signal at the P-PCI bus side for 2 clock cycles which elapsed since the assert, that is, the greater number of CLK cycles out of the assert timing of the signals (TRDY# signal for the P-PCI bus side and FRAME# signal for the S-PCI side) to be the reference of the counting of the P-PCI bus counter circuit 25 and the S-PCI bus counter circuit 26 to execute access from S-PCI. Then the arbiter circuit 32, which received the notification to delay the TRDY# signal for 2 clock cycles from the scheduler circuit 31, notifies the controller circuit 29 incorporated in the P-PCI bus interface circuit 30 to delay the TRDY# signal 38 for 2 clock cycles. Then the data transfer at the P-PCI bus side completes in 5 clock cycles, but the TRDY# signal 38 is asserted at 2 clock cycles delayed after the data transfer completion, so after confirming the 5 clock cycle of the completion of the P-PCI bus side, the arbiter circuit 32 instructs the S-PCI bus interface circuit 28 to execute arbitration to the S-PCI bus, and asserts the IRDY# signal so as to grant the S-PCI master device 22b access. Then the S-PCI master device 22b, which received the grant of data transfer, accesses the external storage medium 23 via the S-PCI bus interface circuit 28 and the memory interface circuit 33. After access from the S-PCI master device 22b to the external storage medium 23 completes, the S-PCI bus interface circuit 28 asserts the TRDY# signal for access completion to the scheduler circuit 31. The scheduler circuit 31, which confirmed the assert of the TRDY# signal, notifies the arbiter circuit 32 to restart access from the P-PCI bus side. Finally, the arbiter circuit 32, which received the notification to restart access at the P-PCI bus side from the scheduler 31, notifies the P-PCI bus interface circuit 30 to execute arbitration to the P-PCI master device 22a and to restart burst transfer to the external storage medium 23.

By delaying the assert of the TRDY# signal in the second data transfer at the P-PCI side so that the third data transfer at the P-PCI side completes within 8 clock cycles after the TRDY# signal for the second data transfer is asserted at the P-PCI side, the burst transfer at the P-PCI side is not interrupted, and the third data transfer at the P-PCI side can be executed continuously after the data transfer at the S-PCI side is over, so even if access at the S-PCI bus side is generated during burst transfer at the P-PCI bus side, high-speed data transfer can be implemented.

EMBODIMENT 2

Embodiment 2 will be described with reference to FIG. 5 and FIG. 6.

FIG. 5 is a diagram depicting the configuration of the data transfer control device according to embodiment 2. FIG. 6 is a timing chart depicting the operation of the data transfer control device according to embodiment 2, where the timing chart of each control signal at the P-PCI bus 41a side and the S-PCI bus 41b side, which access the external storage device 43 with a 32-bit data bus width, are shown at the top and bottom, and the timing chart of the request S signal line 54 and the request P signal line 55 and the memory access arbiter and status transition of the memory access are shown in the middle, and in this timing chart, the burst transfer of the P-PCI bus side, shown at the top, is disconnected by the STOP# signal 58.

Figure 6:
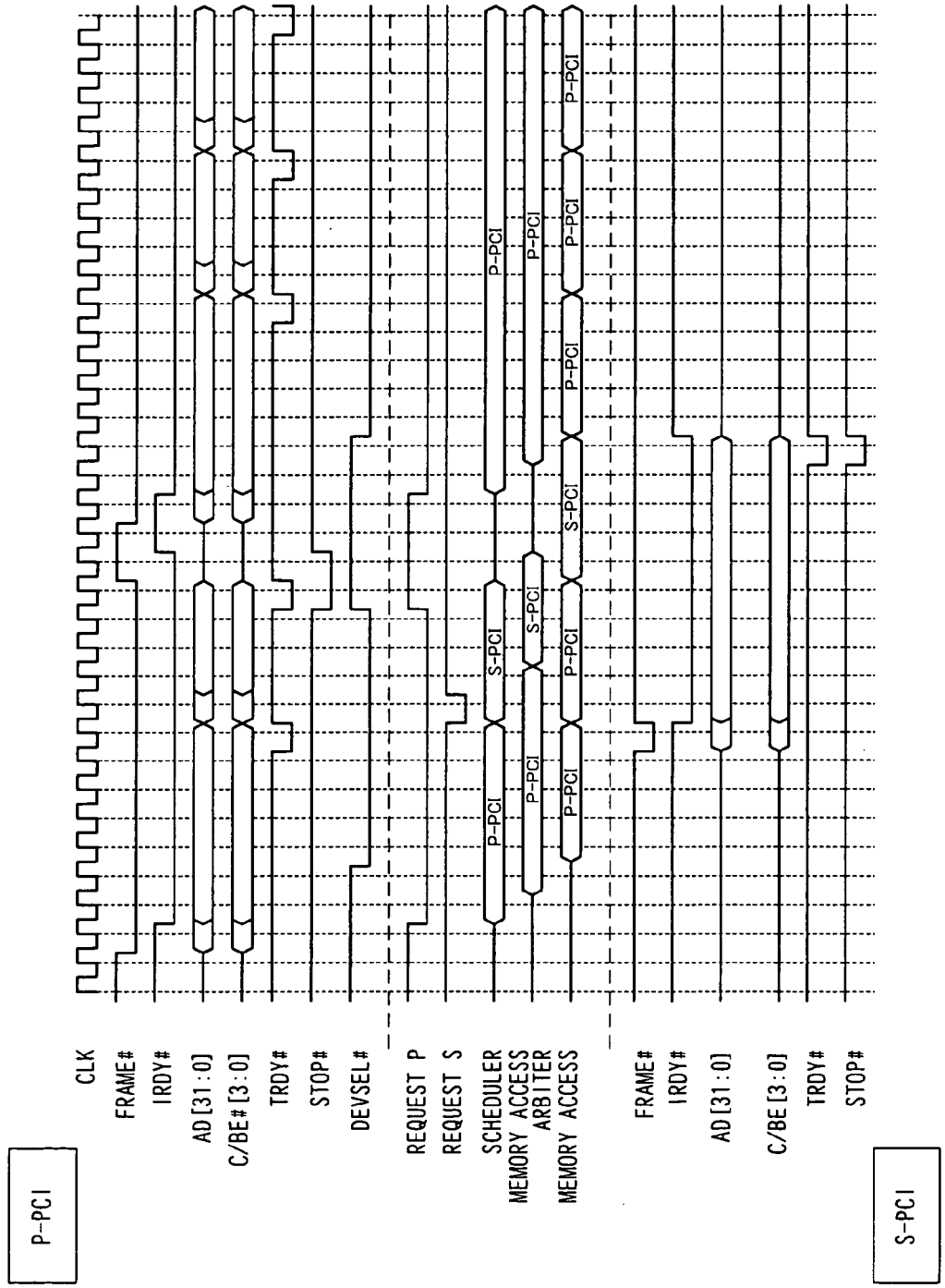
FIG. 6 is a timing chart depicting the operation of the data transfer control device according to the embodiment 2.

In FIG. 5 and FIG. 6, when the P-PCI master device 42a asserts the FRAME# signal 56 to the data transfer control device 44 and requests data transfer, the P-PCI bus interface circuit 50 responds DEVSEL# to the P-PCI master device 42a, and starts accessing the external storage medium 43. After one data transfer, the P-PCI bus interface circuit 50 judges the status of the FRAME# signal 56, and confirms that it is in assert status, and then starts burst transfer to the external storage medium 43. While the P-PCI bus side is executing burst transfer, if the S-PCI master device 42b asserts the FRAME# signal 57 to the data transfer control device 44 and requests data transfer, the monitor circuit for monitoring 47 detects the access from the S-PCI master device 42b by asserting the FRAME# signal 57, and the S-PCI interface circuit 48 sends the request S signal 54 to the scheduler circuit 51 to request data transfer to the S-PCI bus side. The scheduler circuit 51, which received the request S signal 54, disconnects the P-PCI bus interface circuit 50 currently executing burst transfer by asserting the STOP# signal, and notifies the arbiter circuit 52 to access from the S-PCI bus 41b. Then the arbiter circuit 52, which received the notification to disconnect by asserting the STOP# signal from the scheduler circuit 51, notifies the P-PCI bus interface circuit 50 to disconnect by asserting the STOP# signal. Then the P-PCI bus interface circuit 50 performs disconnect by asserting the STOP# signal 58 during data transfer, then the arbiter circuit 52 instructs the S-PCI bus interface circuit 48 to execute arbitration to the S-PCI bus and grant access to the S-PCI master device 42b by asserting the IRDY# signal. The P-PCI master device 42a, of which data transfer was interrupted by the generation of a disconnection, requests data transfer to the data transfer control device 44 immediately after disconnection by asserting the FRAME# signal 56. Then the S-PCI master device 42b, which received the grant of data transfer, accesses the external storage medium 43 via the S-PCI bus interface circuit 48 and the memory interface circuit 53. After access from the S-PCI master device 42b to the external storage medium 43 completes, the S-PCI bus interface circuit 48 asserts the TRDY# signal for access completion to the scheduler circuit 51. The scheduler circuit 51, which confirmed the assert of the TRDY# signal, notifies the arbiter circuit 52 to restart access from the P-PCI bus 41a side. Finally the arbiter circuit 52, which received the notification to restart access to the P-PCI bus 41a side from the scheduler circuit 51, notifies the P-PCI bus interface circuit 50 to execute arbitration for the P-PCI master device 42a and to restart burst transfer to the external storage medium 43.

In this way, the FRAME# signal is asserted immediately after transfer at the P-PCI bus side is disconnected, so transfer can be prepared at the P-PCI bus side while transfer is being executed at the S-PCI bus side, and the time from the end of transfer at the S-PCI bus side to the start of transfer at the P-PCI bus side can be decreased. Therefore even if access is generated at the S-PCI bus side during burst transfer at the P-PCI bus side, high-speed data transfer can be implemented.

EMBODIMENT 3

Embodiment 3 will be described with reference to FIG. 7 and FIG. 8.

Figure 7:
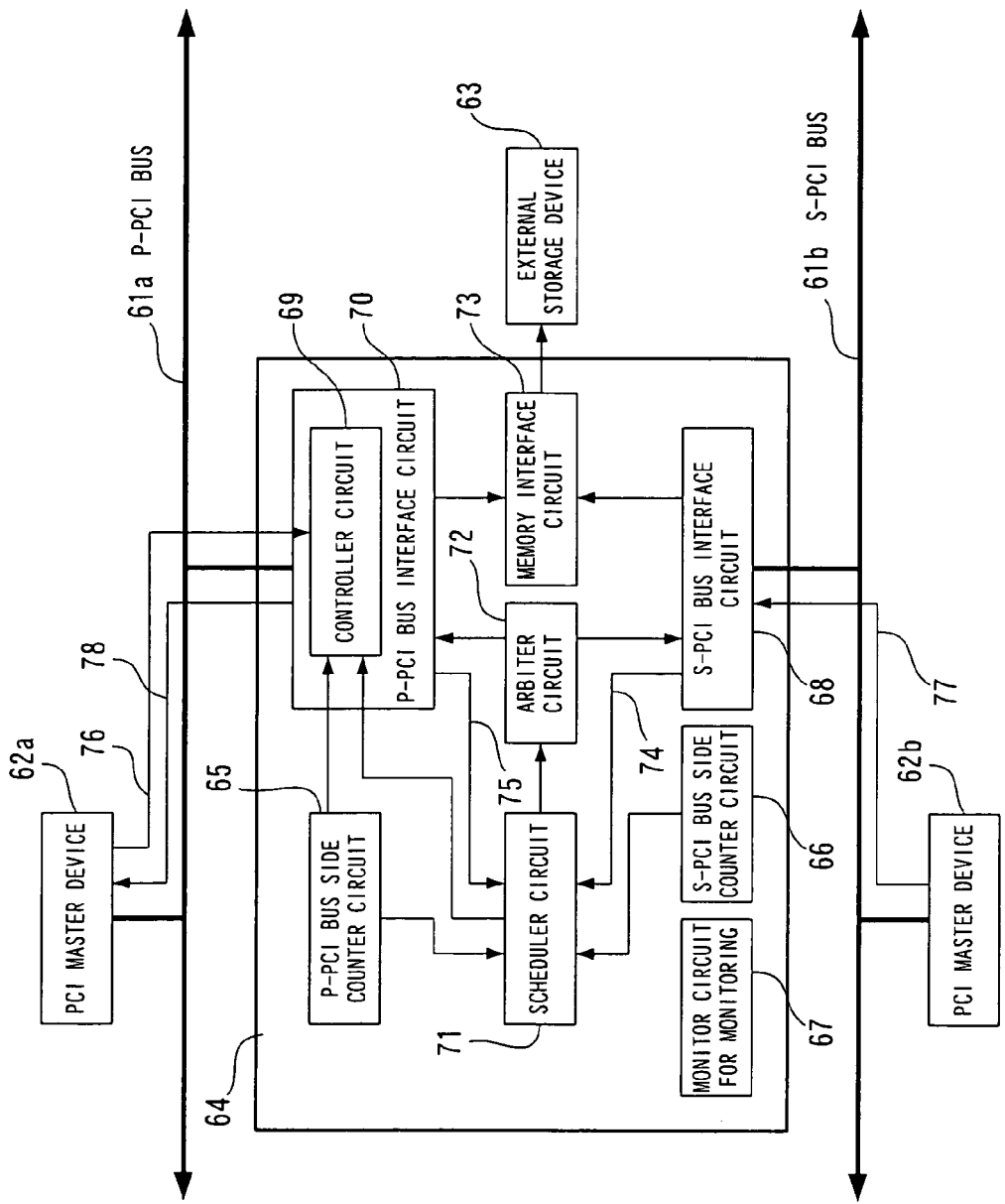
FIG. 7 is a diagram depicting the configuration of a data transfer control device according to embodiment 3 of the present invention.

FIG. 7 is a diagram depicting the configuration of the data transfer control device according to embodiment 3. FIG. 8 is a timing chart depicting the operation of the data transfer control device according to embodiment 3, where the timing chart of each control signal at the P-PCI bus 61a side, which accesses the external storage device 63 with a 16-bit data bus width by 32-bit access, and at the S-PCI bus 61b side, which access [the external storage device 63] by 16-bit access, are shown at the top and the bottom, and the timing chart of the request S signal line 74 and the request P signal line 75 and the memory access arbiter and the status transition of the memory access are shown in the middle, and in this timing chart, the assert timing of the control signal TRDY# signal 78 at the P-PCI bus side shown at the top, is delayed. To perform 32-bit data transfer to the external storage medium 63 with a 16-bit data bus width, it is assumed that the upper or lower 16-bit data is transferred at the first data transfer, and the remaining 16-bit data is transferred after the first transfer is completed, and it is assumed that 16-bit access is used for access from the S-PCI bus master 62b regarding that 6 clock cycles are required for 32-bit data transfer.

Figure 8:
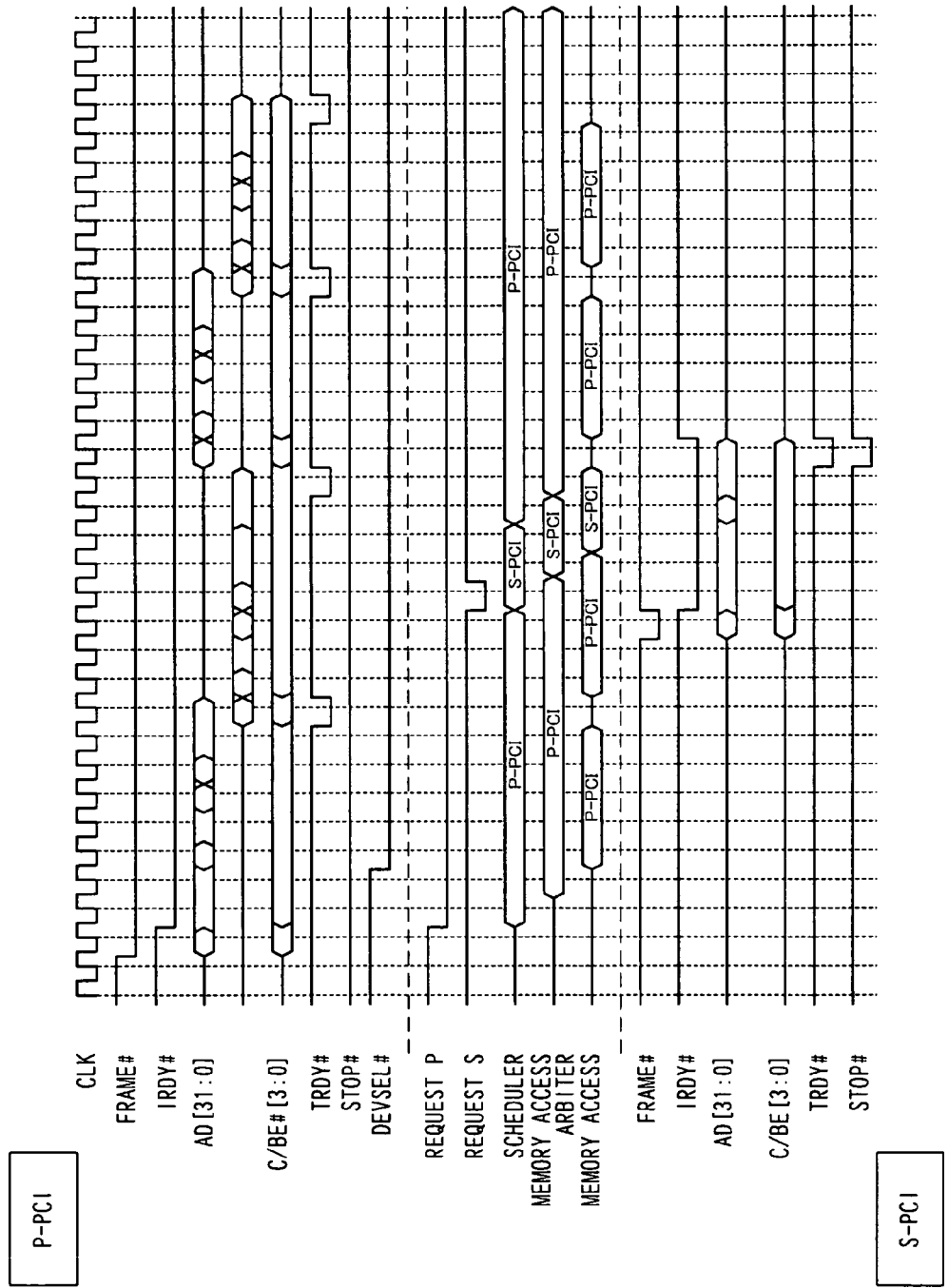
FIG. 8 is a timing chart depicting the operation of the data transfer control device according to the embodiment 3.

In FIG. 7 and FIG. 8, when the P-PCI master device 62a asserts the FRAME# signal 76 to the data transfer control device 64 and requests data transfer, the P-PCI bus interface circuit 70 responds DEVSEL# to the P-PCI master device 62a, and starts accessing the external storage medium 63 with a 16-bit data bus width. After one data transfer, the P-PCI bus interface circuit 70 judges the status of the FRAME# signal 76, and confirms that it is in assert status, then starts burst transfer to the external storage medium 63. While the P-PCI bus side is executing burst transfer, if the S-PCI master device 62b asserts the FRAME# signal 77 to the data transfer control device 64 and requests data transfer, the monitor circuit for monitoring 67 detects the access from the S-PCI master device 62b by asserting the FRAME# signal 77, and the S-PCI interface circuit 68 sends the request signal 74 to the scheduler circuit 71 to request data transfer to the S-PCI bus 61b side. Then the scheduler circuit 71, which received the request S signal 74, notifies the arbiter circuit 72 to assert the TRDY# signal with delaying 2 clock cycles, and access the memory from this S-PCI-bus 61b, because it has been notified from the P-PCI bus side counter circuit 65 that the CLK cycle count after TRDY# is asserted is 4, and it has been notified from the S-PCI bus counter circuit 66 that the CLK cycle count after the FRAME# signal is asserted is 1, so the difference between the 6 clock cycles to be required for one data transfer and the 4 clock cycles which elapsed since the TRDY# signal was asserted at the P-PCI bus side is 6−4=2. Then the arbiter circuit 72, which received the notification to delay the TRDY# signal for 2 clock cycles from the scheduler circuit 71, notifies the controller circuit 69 incorporated in the P-PCI bus interface circuit 70 to delay the TRDY# 78 signal for 2 cycles. Then the data transfer at the P-PCI bus side completes in 6 clock cycles, but the TRDY# signal 78 is asserted at 2 clock cycles after data transfer completion, so after confirming the completion of the 6 clock cycle data transfer at the P-PCI bus 61a side, the arbiter circuit 72 instructs the S-PCI bus interface circuit 68 to execute arbitration to the S-PCI bus, and asserts the IRDY# signal so as to grant the S-PCI master device 62b access. Then the S-PCI master device 62b, which received the grant of data transfer, accesses the external storage medium 63 via the S-PCI bus interface circuit 68 and the memory interface circuit 73. After access from the S-PCI master device 62b to the external storage medium 63 completes, the S-PCI bus interface circuit 68 asserts the TRDY# signal for access completion to the scheduler circuit 71. The scheduler circuit 71, which confirmed assert of the TRDY# signal, notifies the arbiter circuit 72 to restart access from the P-PCI bus side. Finally, the arbiter circuit 72, which received the notification to restart access at the P-PCI bus 61a side from the scheduler circuit 71, notifies the P-PCI interface circuit 70 to execute arbitration to the P-PCI master device 62a and to restart burst transfer to the external storage medium 63.

By delaying assert of the TRDY# signal in the second data transfer at the P-PCI side so that the third data transfer at the P-PCI side completes within 8 clock cycles after the TRDY# signal for the second data transfer is asserted at the P-PCI side, burst transfer at the P-PCI side is not interrupted, and the third data transfer at the P-PCI side can be executed continuously after data transfer at the S-PCI side is over, so even if access at the S-PCI side is generated during burst transfer at the P-PCI bus side, high-speed data transfer can be implemented.

EMBODIMENT 4

Embodiment 4 will be described with reference to FIG. 9 and FIG. 10.

Figure 9:
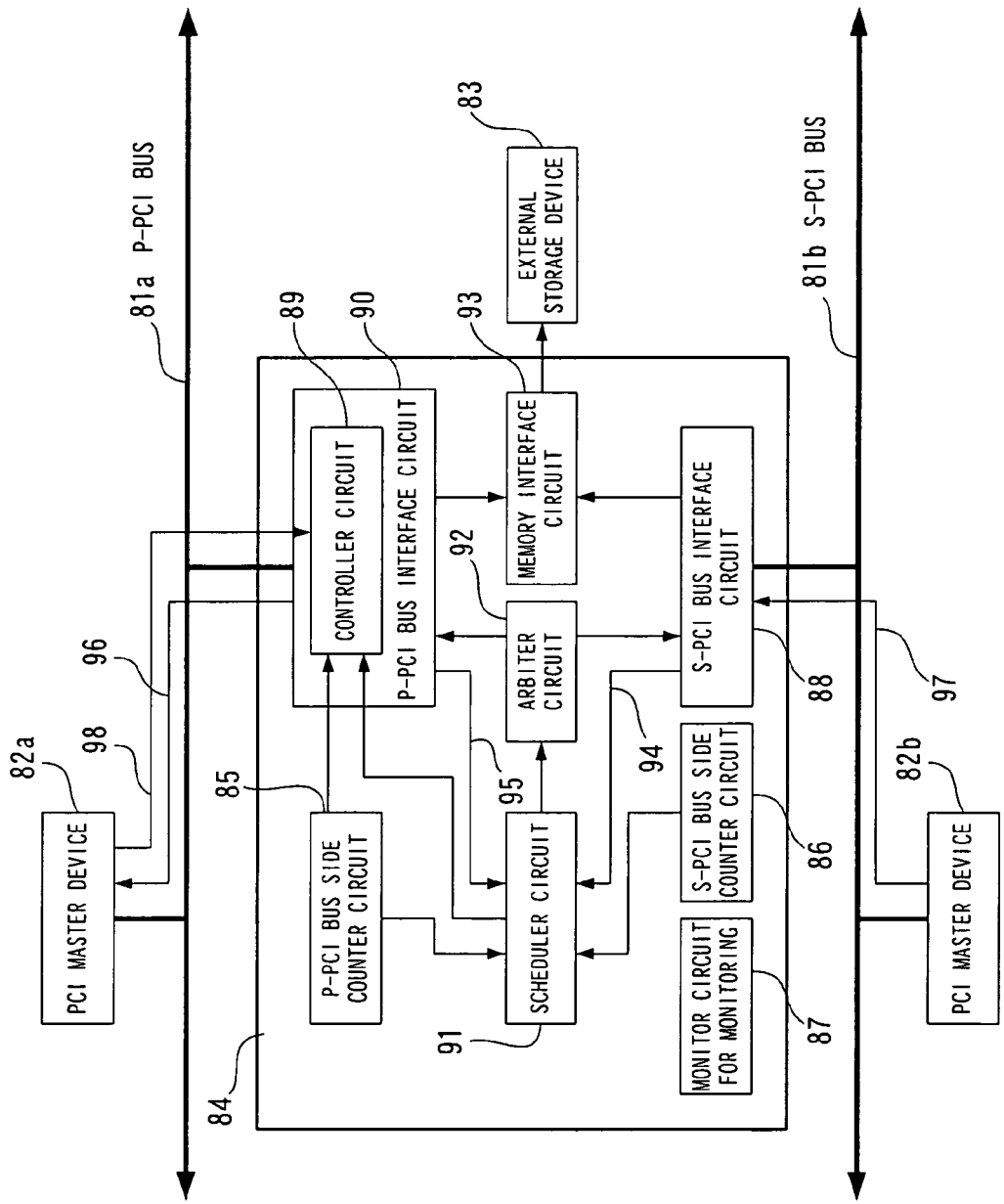
FIG. 9 is a diagram depicting the configuration of a data transfer control device according to embodiment 4 of the present invention.

FIG. 9 is a diagram depicting the configuration of the data transfer control device according to embodiment 4. FIG. 10 is a timing chart depicting the operation of the data transfer control device according to embodiment 4, where the timing chart of each control signal at the P-PCI bus 81a side and the S-PCI bus 81b side, which access the external storage medium 83 with a 16-bit data bus width by 32-bit access, are shown at the top and the bottom, and the timing chart of the request S signal 94 and the request P signal 95 and the memory access arbiter and the status transition of memory access are shown in the middle, and in this timing chart, the assert timing of the control signal TRDY# signal 98 at the P-PCI bus 81a side shown at the top, is delayed. To perform 32-bit data transfer to the external storage medium 83 with a 16-bit data bus width, it is assumed that the upper or lower 16-bit data is transferred at the first data transfer, and the remaining 16-bit data is transferred after the first transfer is completed, and it is assumed that 6 clock cycles are required for 32-bit data transfer.

Figure 10:
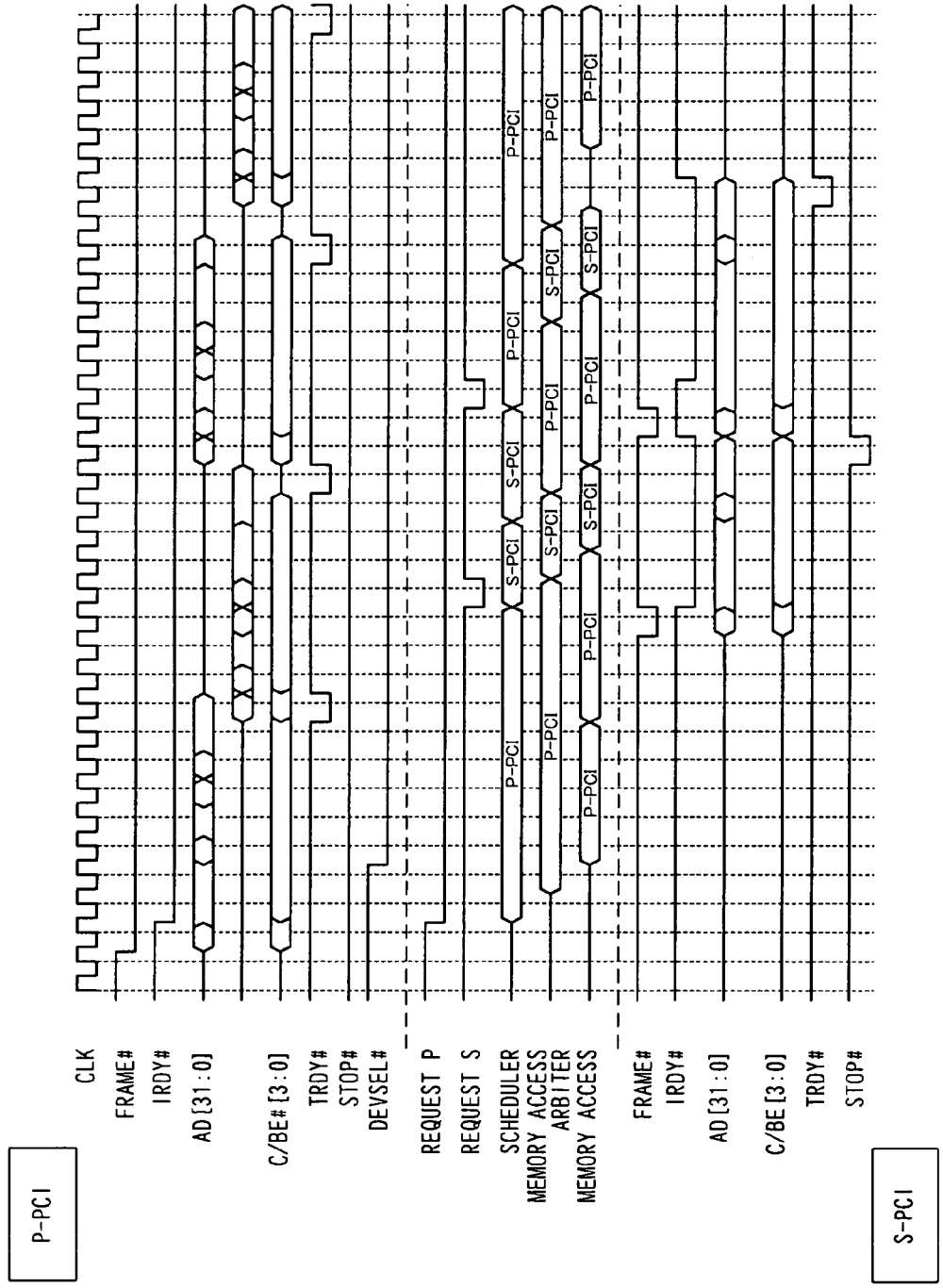
FIG. 10 is a timing chart depicting the operation of the data transfer control device according to the embodiment 4.

In FIG. 9 and FIG. 10, when the P-PCI master device 82a asserts the FRAME# signal 96 to the data transfer control device 84 and requests data transfer, the P-PCI bus interface circuit 90 responds DEVSEL# to the P-PCI master device 82a, and starts accessing the external storage medium 83 with a 16-bit data bus width. After one data transfer, the P-PCI bus interface circuit 90 judges the status of the FRAME# signal 96 and confirms that it is in assert status, then starts burst transfer to the external storage medium 83. While the P-PCI bus 81a side is executing burst transfer, if the S-PCI master device 82b asserts the FRAME# signal 97 to the data transfer control device 84 and requests data transfer, the monitor circuit for monitoring 87 detects the access from the S-PCI master device 82b by asserting the FRAME# signal 97, the S-PCI interface circuit 88 sends the request signal S 94 to the scheduler circuit 91 to request data transfer to the S-PCI bus 81b side. Then the scheduler circuit 91, which received the request S signal 94, notifies the arbiter circuit 92 to assert the TRDY# signal with delaying 2 clock cycles, and access the memory from the S-PCI, because it has been notified from the P-PCI bus side counter circuit 85 that the CLK cycle count after TRDY# is asserted is 4, and it has been notified from the S-PCI bus counter circuit 86 that the CLK cycle count after the FRAME# signal is asserted is 1, so the difference between the 6 clock cycles to be required for one data transfer and the 4 clock cycle elapsed since the TRDY# signal was asserted at the P-PCI side is 6−4=2. Then the arbiter circuit 92, which received the notification to delay the TRDY# signal for 2 clock cycles from the scheduler circuit 91, notifies the controller circuit 89 incorporated in the P-PCI bus interface circuit 90 to delay the TRDY# signal 98 for 2 cycles. Then the data transfer at the P-PCI bus 81a side completes in 6 clock cycles, but the TRDY# signal 98 is asserted at 2 clock cycles after data transfer completion, so after confirming completion of the 6 clock cycle data transfer at the P-PCI bus side, the arbiter circuit 92 instructs the S-PCI bus interface circuit 88 to execute arbitration to the S-PCI bus, and asserts the IRDY# signal so as to grant the S-PCI master device 82b access.

Then the S-PCI master device 82b, which received the grant, accesses the external storage medium 83 via the S-PCI bus interface circuit 88 and the memory interface circuit 93. After the first 16-bit data transfer from the S-PCI master device 82b to the external storage medium 83 completes, the S-PCI bus interface circuit 88 notifies the request S signal 94 for access completion to the scheduler circuit 91, and the scheduler circuit 91, which received the notification, notifies the arbiter circuit 92 to disconnect access from the S-PCI bus 81b side. The arbiter circuit 92, which received the disconnect request from the scheduler circuit 91, has the S-PCI bus interface circuit 88 disconnect by asserting the STOP# signal to the S-PCI master device 82a. The arbiter circuit 92, which confirmed assert of the STOP# signal of the S-PCI bus interface circuit 88, has the P-PCI bus interface circuit 90 to execute arbitration to the P-PCI master device 82a, and to restart burst transfer to the external storage medium 83. The S-PCI master device 82b, of which data transfer was interrupted by the generation of a disconnection, requests data transfer to the data transfer control device 84 by asserting the FRAME# signal 97 immediately after disconnection. If the data transfer request is generated from the S-PCI master device 82b again by asserting the FRAME# signal 97, the S-PCI master device 82b accesses the external storage medium 83, as mentioned above. After access from the S-PCI master device 82b to the external storage medium 83 completes, the S-PCI bus interface circuit 88 asserts the TRDY# signal for access completion to the scheduler circuit 91. The scheduler circuit 91, which confirmed assert of the TRDY# signal, notifies the arbiter circuit 92 to restart access from the P-PCI bus 81a side. Finally, the arbiter circuit 92, which received the notification to restart access at the P-PCI bus 81a side from the scheduler circuit 91, notifies the P-PCI bus interface circuit 90 to execute arbitration to the P-PCI master device 82a, and to restart burst transfer to the external storage medium 83.

By delaying assert of the TRDY# signal in the data transfer at the P-PCI side so that the next data transfer at the P-PCI side completes within 8 clock cycles after the TRDY# signal for the data transfer is asserted at the P-PCI side, the burst transfer at the P-PCI is not interrupted, and data transfer at the P-PCI side can be executed continuously after data transfer at the S-PCI side is completed, so even if access at the S-PCI bus side is generated during burst transfer at the P-PCI bus side, high-speed data transfer can be implemented.

As described above, according to the data transfer control device, the assert of the TRDY# signal for the data transfer at the P-PCI side is delayed so that the next data transfer at the P-PCI side completes within 8 clock cycles after the TRDY# signal for the data transfer at the P-PCI side is asserted, so even if the S-PCI bus requests transfer while the P-PCI bus is executing burst transfer, the burst transfer at the P-PCI side is not interrupted, and data transfer at the P-PCI side can be continuously executed after data transfer at the S-PCI side is completed, therefore high-speed data transfer can be implemented, even if access at the S-PCI bus side is generated while the P-PCI bus side is executing burst transfer.

Also it is constructed such that the FRAME# signal is asserted immediately after transfer at the P-PCI bus side is disconnected, so transfer at the P-PCI bus side can be prepared during transfer at the S-PCI bus side, and the time from the end of transfer at the S-PCI bus side to the start of transfer at the P-PCI bus side can be decreased. Therefore high-speed data transfer can be implemented, even if access is generated at the S-PCI bus side while the P-PCI bus side is executing burst transfer.

What is claimed is:

1. A data transfer control device, connected with a primary PCI bus, secondary PCI bus and external storage device, for controlling access of said primary PCI bus and said secondary PCI bus with said external storage device, comprising:
   a P-PCI bus side counter circuit for counting the transfer period of said primary PCI bus by clock cycle count;
   an S-PCI bus side counter circuit for counting the transfer period of said secondary PCI bus by clock cycle count;
   a scheduler circuit for controlling assert timing of TRDY# of said primary PCI bus and access of said primary PCI bus and said secondary PCI bus by the counter value of said P-PCI bus side counter circuit and counter value of said S-PCI bus side counter circuit;
   an arbiter circuit for arbitrating access of said primary PCI bus and said secondary PCI bus according to the control of said scheduler circuit;
   an S-PCI bus interface circuit to be an interface for accessing of said secondary PCI bus to said external storage device according to the arbitration of said arbiter circuit;
   a P-PCI bus interface circuit for interfacing access between said primary PCI bus and said external storage device according to the arbitration of said arbiter circuit and arbitrating the assert timing of TRDY# according to the control of said scheduler; and
   a memory interface circuit for arbitrating access of said primary PCI bus or said secondary PCI bus to said external storage device, wherein
   when access of said secondary PCI bus to said external storage device is generated while said primary PCI bus is executing burst transfer to said external storage device, assert of a TRDY# signal of the burst transfer of said primary PCI bus to said external storage device just before access of said secondary PCI bus to said external storage device is delayed such that the period until assert of a TRDY# signal of next burst transfer of said primary PCI bus to said external storage device would satisfy a standard value for burst transfer continuation.

2. A data transfer control device, connected with a primary PCI bus, secondary PCI bus and external storage device, for controlling access of said primary PCI bus and said secondary PCI bus with said external storage device, comprising:
   a P-PCI bus side counter circuit for counting the transfer period of said primary PCI bus by clock cycle count;
   an S-PCI bus side counter circuit for counting the transfer period of said secondary PCI bus by clock cycle count;
   a scheduler circuit for controlling assert timing of TRDY# of said primary PCI bus and access of said primary PCI bus and said secondary PCI bus by the counter value of said P-PCI bus side counter circuit and the counter value of said S-PCI bus side counter circuit;
   an arbiter circuit for arbitrating access of said primary PCI bus and said secondary PCI bus according to the control of said scheduler circuit;
   an S-PCI bus interface circuit to be an interface for accessing of said secondary PCI bus to said external storage device according to the arbitration of said arbiter circuit;
   a P-PCI bus interface circuit for interfacing access of said primary PCI bus to said external storage device according to the arbitration of said arbiter circuit and arbitrating the assert timing of TRDY# according to the control of said scheduler; and a memory interface circuit for arbitrating access of said primary PCI bus or said secondary PCI bus to said external storage device, wherein when a plurality of accesses of said secondary PCI bus to said external storage device is generated while said primary PCI bus is executing burst transfer to said external storage device, access of said primary PCI bus to said external storage device and access of said secondary PCI bus to said external storage device are repeated, and assert of a TRDY# signal of the burst transfer of said primary PCI bus to said external storage device just before each access of said secondary PCI bus to said external storage device is delayed such that the period until assert of a TRDY# signal of next burst transfer of said primary PCI bus to said external storage device would satisfy a standard value for burst transfer continuation.

3. A data transfer control device, connected with a primary PCI bus, secondary PCI bus and external storage device, for controlling access of said primary PCI bus and said secondary PCI bus with said external storage device, comprising:

a scheduler circuit for controlling access of said primary PCI bus and said secondary PCI bus, disconnecting said primary PCI bus and requesting access of said secondary PCI bus to said external storage device when access of said secondary PCI bus to said external storage device is generated while said primary PCI bus is executing burst transfer to said external storage device, and then successively requesting access of said primary PCI bus to said external storage device;

an arbiter circuit for arbitrating access of said primary PCI bus and said secondary PCI bus according to the control of said scheduler circuit;

an S-PCI bus interface circuit to be an interface for accessing of said secondary PCI bus to said external storage device according to the arbitration of said arbiter circuit;

a P-PCI bus interface circuit for interfacing access of said primary PCI bus to said external storage device according to the arbitration of said arbiter circuit; and a memory interface circuit for arbitrating access of said primary PCI bus or said secondary PCI bus to said external storage device, wherein when access of said secondary PCI bus to said external storage device is generated while said primary PCI bus is executing burst transfer to said external storage device, transfer of said primary PCI bus to said external storage device is prepared while said secondary PCI bus is accessing said external storage device.

4. The data transfer control device according to claim 1, wherein said external storage device has a 32-bit data bus width, and both the burst transfer of said primary PCI bus to said external storage device and access of said secondary PCI bus to said external storage device are executed in 32-bit units.

5. The data transfer control device according to claim 1, wherein said external storage device has a 16-bit data bus width, and a 32-bit burst transfer of said primary PCI bus to said external storage device is executed dividing into upper and lower 16-bits each, and access of said secondary PCI bus to said external storage device is also executed in 16-bit units.

* * * * *